June 29, 1937. W. POHL 2,085,272
TRANSMISSION AND CONTROL MECHANISM
Filed July 22, 1935 5 Sheets-Sheet 1

INVENTOR
Walter Pohl
BY
Fred G. Parsons
ATTORNEY

June 29, 1937.  W. POHL  2,085,272

TRANSMISSION AND CONTROL MECHANISM

Filed July 22, 1935  5 Sheets-Sheet 2

INVENTOR
Walter Pohl
BY
Fred G. Parsons
ATTORNEY

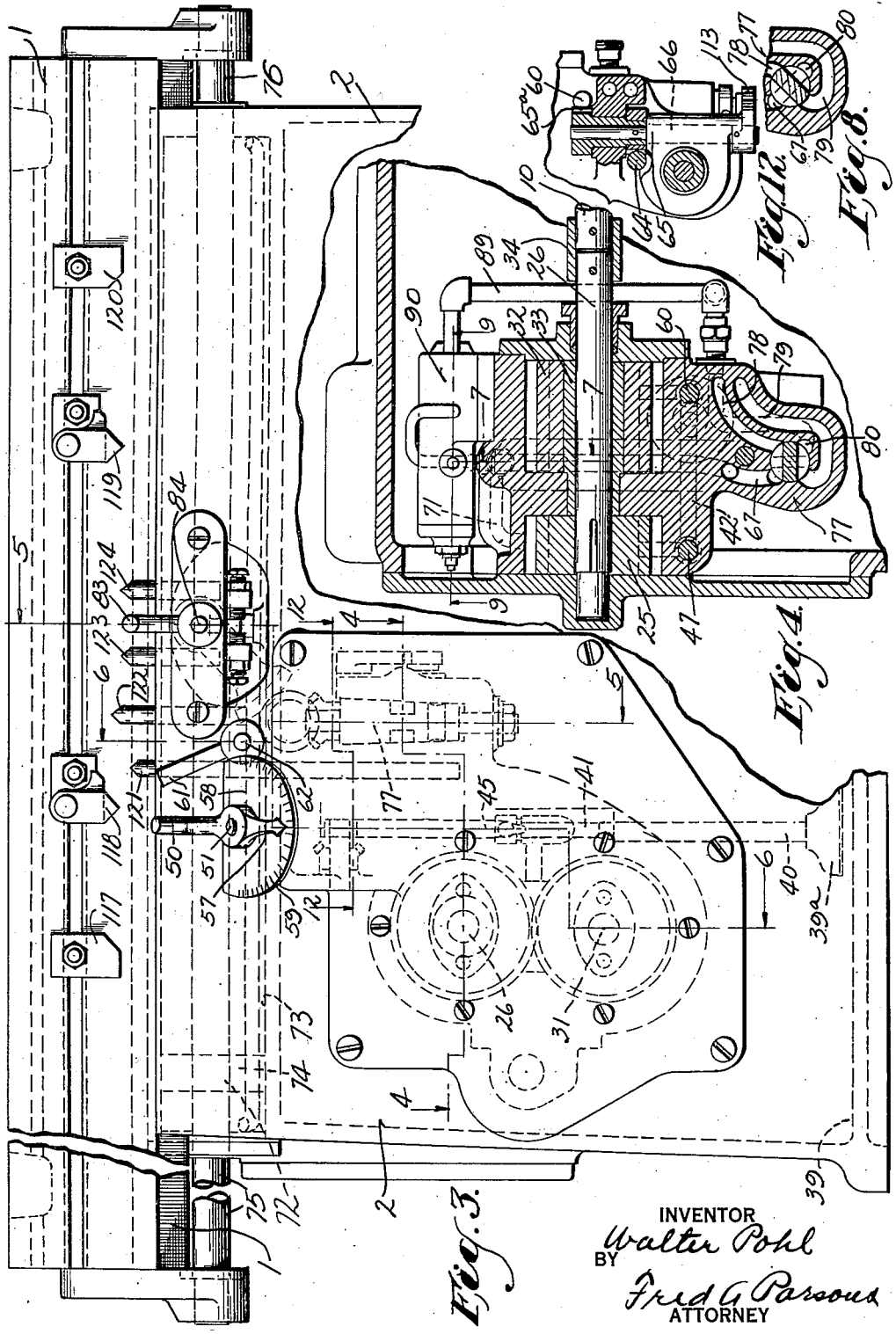

June 29, 1937.   W. POHL   2,085,272
TRANSMISSION AND CONTROL MECHANISM
Filed July 22, 1935   5 Sheets-Sheet 4
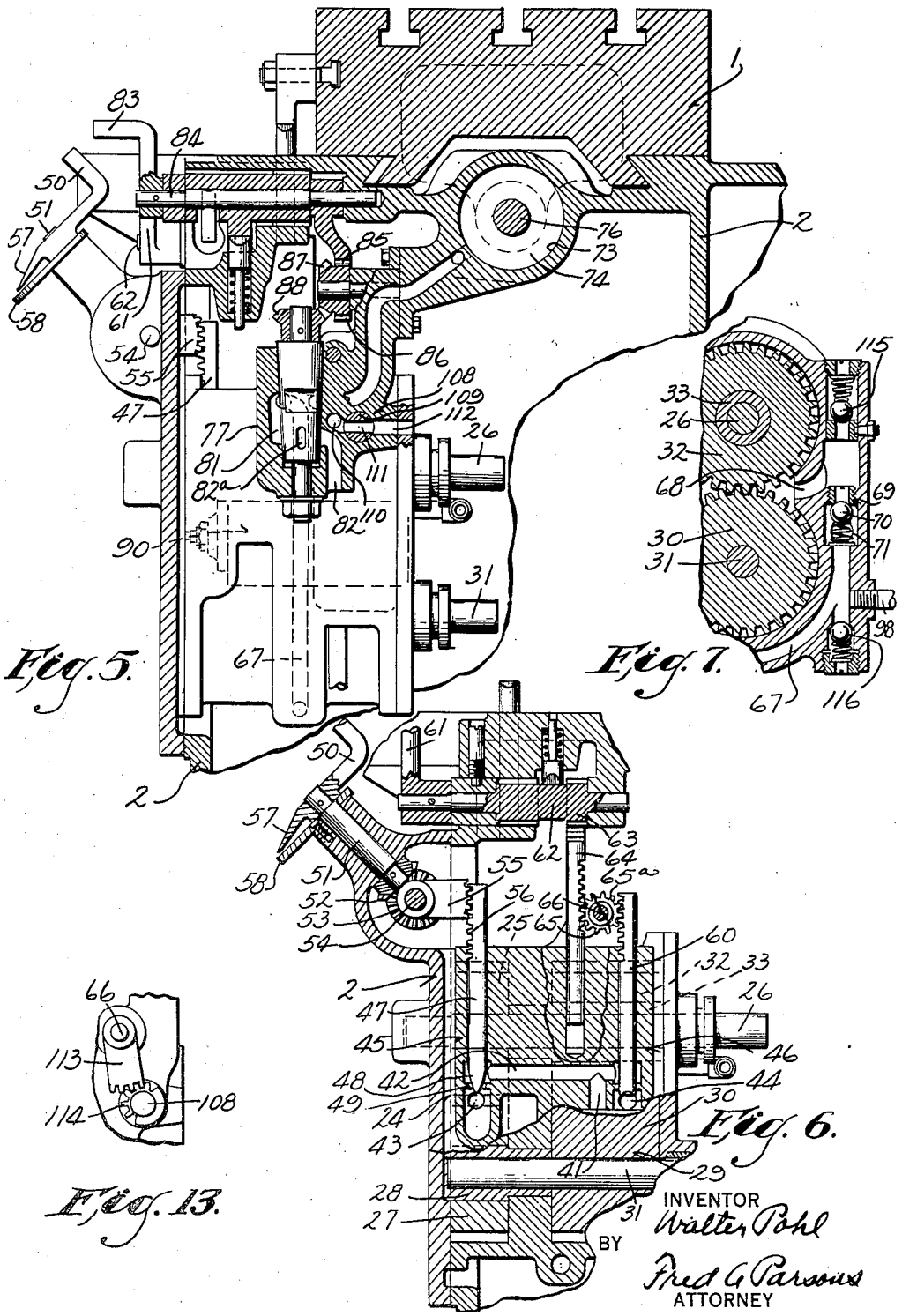

Patented June 29, 1937

2,085,272

UNITED STATES PATENT OFFICE 2,085,272

TRANSMISSION AND CONTROL MECHANISM

Walter Pohl, Detroit, Mich., assignor to Kearney & Trecker Corporation, West Allis, Wis., a corporation of Wisconsin Application July 22, 1935, Serial No. 32,541

18 Claims. (Cl. 90—21.5)

This invention relates to transmission and control mechanism and more particularly to a construction thereof which is adapted for use in machine tools and machines having similar transmission and control requirements.

In many machines and particularly in milling machines, the operation of the machine creates undesirable chatter or vibration, or tendency for the driven portion of the transmission to overrun the driving portion. A purpose of the invention is to provide a transmission and control mechanism which will avoid these undesirable results.

A further purpose is to provide a transmission in which the chatter, vibration or tendency to over-run is overcome by setting up a back pressure resisting the movement of the driven portion, but in such form that the degree or amount of back pressure is automatically controlled to be applied as it is required, whereby no energy is wasted in overcoming unnecessary back pressure.

A further purpose is to provide improved control mechanism operative to reduce the back pressure at such times as high back pressure is not necessary, as for instance when the transmission load opposes the driving force, or when the table is operating at quick traverse rate, whereby the capacity of the transmission will not be reduced or the power input increased, except when necessary.

A further purpose is to provide an improved transmission control mechanism including back pressure mechanism in a form such that it will avoid power or resistance surging such, for instance, as might be occasioned if the control mechanism had a tendency to over-correct the conditions controlled thereby.

A further purpose is to provide an improved transmission control mechanism in a form such that it will respond substantially instantly to increase the back pressure when necessary to overcome a sudden tendency to over-run, yet will respond relatively slowly to decrease the back pressure.

A further purpose is to provide improved back pressure control mechanism for some or all of the purposes above mentioned in which the control result effected is substantially independent of the rate of movement of the transmission, at least to the extent that the rate may be varied over as wide range as is necessary, for instance, for the feed transmission of a milling machine, while still maintaining the back pressure device suitably operative at any available rate.

A further purpose is to provide improved means for one or more of the control effects above mentioned in a form particularly adapted for the control of hydraulic transmissions.

A further purpose is to provide an improved back pressure control valve for hydraulic transmissions and improved means for operating such a valve.

A further purpose is to provide a hydraulic relief valve with improved means for controlling the valve, and especially for damping out or preventing vibrations, chatter, or oscillations of the valve.

A further purpose is to provide improved mechanism for one or more of the purposes above mentioned in a form particularly adapted for use in milling machines, and for improved combination with the other structure and control mechanism of a milling machine.

A further purpose is to improve upon the transmission and control mechanism for somewhat similar purposes, disclosed in the co-pending application of Fred A. Parsons, Serial No. 321,250, filed November 22, 1928, now Patent 2,020,852 dated November 12, 1935.

A further purpose is to simplify and improve the construction and operation of machine tools generally and especially of milling machines, and still other objects will be apparent from this specification.

The invention consists in the construction, arrangement and combination of parts as herein illustrated, described and claimed, and in such modifications of the structure illustrated and described as may be equivalent to the structure of the claims.

The same reference characters have been used to indicate the same parts throughout, and in the drawings:

Fig. 3 is a partial front elevation of the same machine, enlarged.

Fig. 4 is a partial horizontal section taken approximately along line 4—4 of Fig. 3.

Fig. 5 is a partial vertical section taken approximately along line 5—5 of Fig. 3.

Fig. 6 is a partial vertical section taken approximately along line 6—6 of Fig. 3.

Fig. 7 is a partial vertical section along line 7—7 of Fig. 4.

Fig. 8 is a partial section showing another position of a valve shown in Fig. 4.

Fig. 12 is a partial plan view, partly in section, taken along line 12—12 of Fig. 3.

Fig. 13 is a side elevation of part of the mechanism shown in Fig. 12.

Figures 1, 9:
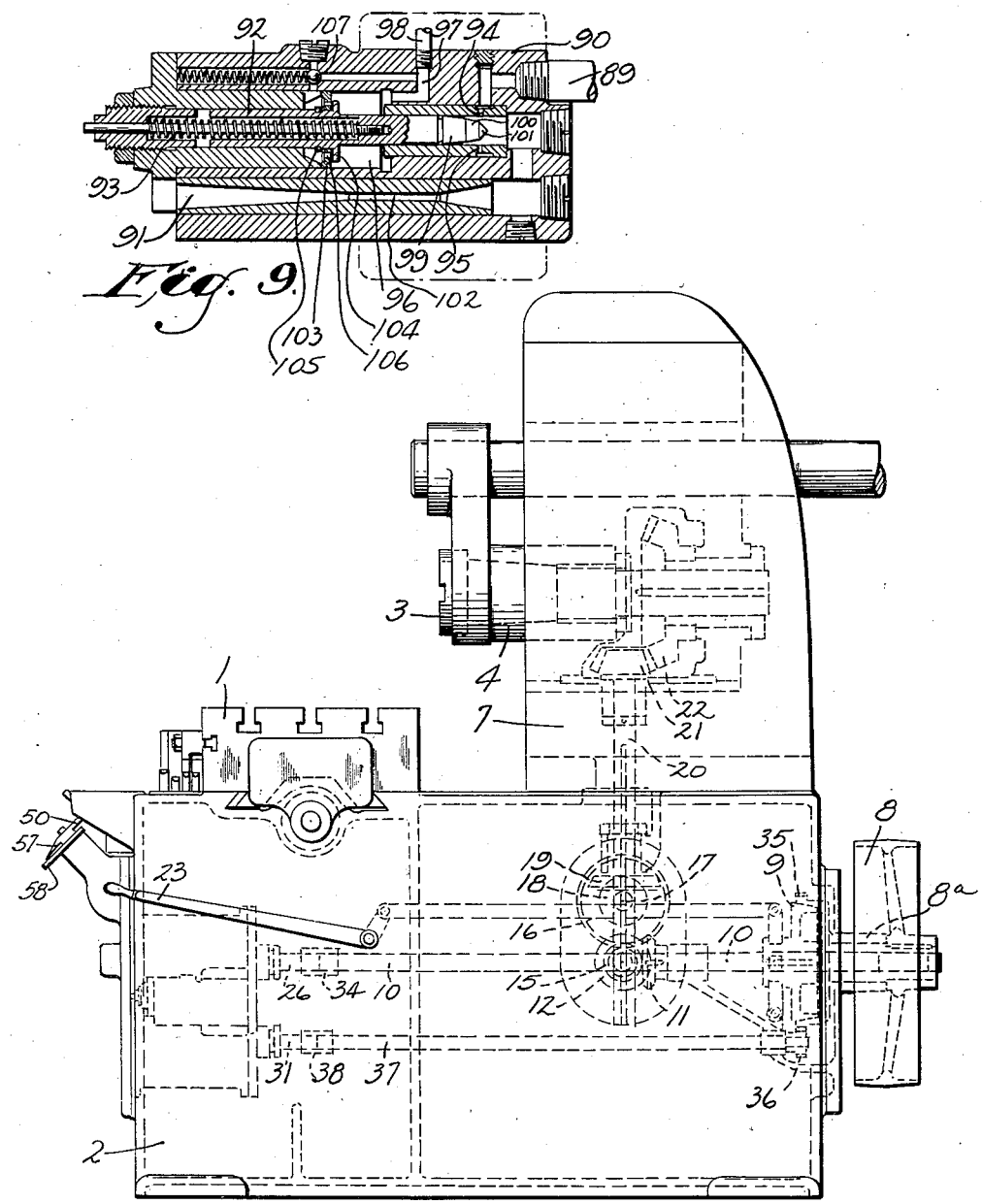
Fig. 1 is a right side elevation of a milling machine in which the invention is incorporated.
Fig. 9 is a vertical section, enlarged, through a back pressure device which automatically controls the back pressure in the table transmission, under certain conditions of table operation, the view being taken along line 9—9 of Fig. 4.
Figure 2:
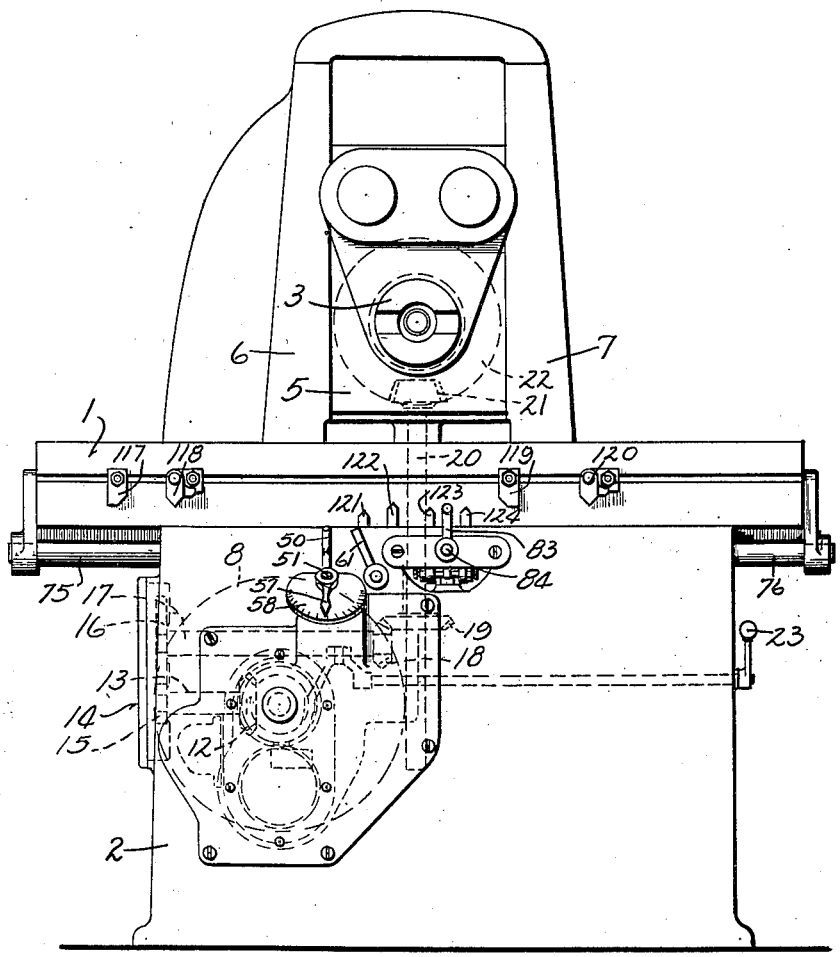
Fig. 2 is a front elevation of the same machine.

The machine here shown is a milling machine which includes a table 1 guided for reciprocatory movement on a bed 2. A tool spindle 3 is rotatably supported for axial movement with a non-rotatable quill 4 which is guided for movement transversely of the table 1 in a carrier 5, guided for bodily vertical movement in side members 6, 7. Suitable adjusting and clamping means, not shown, are provided for the quill 4 and carrier 5.

The spindle 3 is driven from a pulley 8 through transmission mechanism which includes a sleeve 8a, a motion interrupting main clutch 9, a shaft 10, bevel gears 11, 12, shaft 13, a rate changer 14 including removable and reversibly replaceable gear pairs such as gears 15, 16, a shaft 17, bevel gears 18, 19, a shaft 20 and bevel gears 21, 22, the last mentioned gear being provided with an axial bore in which the spindle 3 is slidably keyed. The clutch 9 may be of any suitable form, operated by any suitable means, such as a hand lever 23, to alternatively interrupt or establish a driving connection between sleeve 8a and shaft 10.

The table 1 is driven from pulley 8 through transmission mechanism which is in part hydraulic. A hydraulic unit shown in Figs. 3, 4, 5, 6 includes a feed pump 24, Fig. 6, of relatively small volume comprising a gear 25 fixed on a shaft 26 and a gear 27 rotatable on a sleeve 28. The unit also includes a quick traverse pump 29, Fig. 6, comprising a gear 30 fixed on a shaft 31 and a gear 32 rotatably mounted on a sleeve 33. The feed pump 24 is driven through clutch 9, Fig. 1, the shaft 10 being extended to drive shaft 26 through a coupling 34. The quick traverse pump 29 is driven to exclude clutch 9 through gears 35, 36, Fig. 1, and a shaft 37 which drives shaft 31 through a coupling 38.

Both the pumps 24, 29 draw fluid from a reservoir 39 in the bed 2 through a strainer 39a, Fig. 3, and a pipe 40 which delivers fluid to a channel 41, Figs. 3, 6, and thence to a channel 42, from which the fluid is delivered to the respective pump inlet passages 43, 44, Fig. 6, through adjustable throttle devices respectively indicated by the numerals 45, 46.

The feed pump throttle 45, shown partly open in Fig. 6, includes a plunger 47 having a tapered end portion 48 adjustable relative to a throttle passage 49 to positions substantially closing or opening the throttle passage 49, and to a variety of intermediate positions determinative of corresponding rates of fluid flow to pump 24, by the means of a hand lever 50, Fig. 6, which is connected with plunger 47 by a shaft 51, bevel gears 52, 53, a shaft 54, and a segment 55 engaging rack teeth 56 on the plunger 47. The lever 50 is provided with a pointer 57, Fig. 3, reading against a chart or dial 58 having graduations 59 corresponding to the feed rate obtained in the different positions of throttle 45, the pump together with its throttle etc., providing a rate changer controlling the feed rate of table 1.

The quick traverse pump throttle 46, Fig. 6, is provided with a plunger 60 which may be shifted to alternative positions respectively effective to substantially completely close or open the throttle passage, by the means of a hand lever 61 which is connected with plunger 60 by a shaft 62, Fig. 6, a pinion 63, a plunger 64, a pinion 65 and a pinion 65a, Fig. 12, fixed on a shaft 66 which also operates other mechanism to be later described.

Both the pumps 24, 29, Fig. 6, deliver whatever fluid is permitted to flow through the throttles 45, 46, to a common outlet passageway 67, Fig. 7. The quick traverse pump 29 delivers fluid to a passage 68, Fig. 7, from which the fluid reaches passage 67 through a check valve 69, comprising a spring pressed ball 70 which prevents the pressure from feed pump 24 from reacting on the quick traverse pump 29. The feed pump 24, Fig. 6, delivers to a passage 71, Figs. 4, 7, which directly communicates with passage 67.

A reciprocatory table motor generally denoted by the numeral 72, Figs. 1, 3, includes a cylinder 73, a piston 74 and piston rods 75, 76 fixed with table 1.

The pump outlet passage 67, Figs. 7 and 4, is connectible with table motor 72 through a reverser and interrupter valve generally denoted by the numeral 77, Figs. 3, 4, 5. This valve 77 provides different ports respectively connected to channels 78, 79, Fig. 4, which respectively lead to the different ends of cylinder 73, as shown in Fig. 3. Valve 77 also provides a port connected to an outlet channel 80, Fig. 4.

The reverser valve 77 may be turned to alternative positions respectively connecting the pump outlet channel with either motor channel 78, 79, in which case the other motor channel is thereby connected with the outlet channel 80. The valve 77 also has an intermediate position, shown in Fig. 8, in which both the channels 78, 79 are closed, thereby locking the table and motor against movement, and in which the channel 67 communicates to the reservoir 39 through a channel 81, Fig. 5, which then communicates with a vent channel 82, through a valve channel 82a at a lower level, which is otherwise closed.

Reverser valve 77 is shifted to its various positions by the means of a hand lever 83, Figs. 3, 5, connected to the valve by shaft 84, segment 85, gear 86, and bevel gears 87, 88.

During movement of table piston 74 and table 1 at constant speed, as for instance during feed movements, the sum of positive and negative pressures and other forces acting on the piston 74 must always be zero. If the pressure transmitted to the piston 74 from channel 67 be considered as positive, then the cutting load acting on the table may be either positive, when the cutter tends to move the table in the same direction as the pressure fluid in channel 67, or negative, when the cutter tends to oppose the fluid pressure; but in either event the back pressure in channel 80 will be negative and of such value that the algebraic sum of the back pressure, table load and forward pressure will be zero, neglecting friction.

If there were no back pressure valve in the outlet channel, and the cutting pressure happened to be positive, that is to say in the same direction as the pressure set up by pump 24, instead of negative, then an unbalanced condition would result and the table would over-run its transmission at increasing rate until the friction set up by the rapid movement of the fluid expelled through the outlet channels by piston 74 created sufficient back pressure or negative variation, in table transmission requirements for a milling machine, for instance, may be in a ratio as large as one hundred, or more, to one.

By reason of frictional losses, the forward pressure required to drive the table is relatively increased as the rate rises, even when there is no cutting load. The result might be, unless prevented, that the back pressure would fall to an undesirable extent at the high table rates as compared with low table rates by reason of the increased opening of the back pressure throttle in response to the increased pressure in channel 67. The throttle of device 90 is increasingly opened as the motor rate increases.

To overcome or minimize such falling off of back pressure at high motor rates, means are provided to proportionately increase the back pressure, independently of the operation of throttle plunger 92, as the motor speed increases.

To some extent this is brought about by the relatively small size of the throttle openings 94, 95, but principally by providing an outlet passage portion 102, Fig. 9, of reduced diameter and of sufficient length for the operating characteristics desired of the transmission. At relatively slow speeds the passage 102 offers but little resistance to the flow of fluid therethrough, but the resistance increases rapidly as the motor rate increases, to provide additional back pressure independently of the position of throttle plunger 92, sufficient to compensate to the desired degree for the decrease in plunger effect at high rates as previously mentioned.

Figure 11:
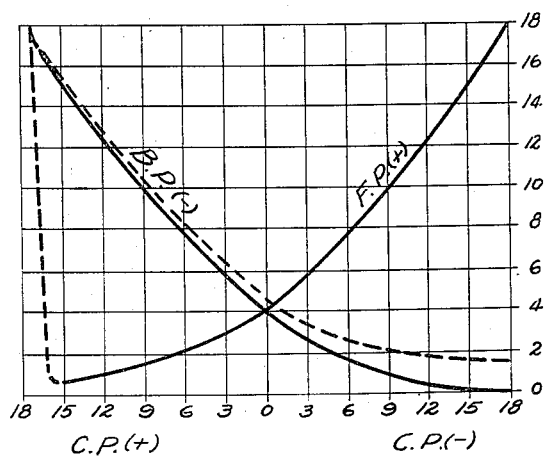

In part as a result of the supplemental back pressure means just mentioned, and in part by reason of the selection of suitable design characteristics and relationship for the various elements of the device 90, the back pressure set up under varying operating conditions in the machine here shown corresponds more nearly to the preferred values indicated by the dotted line of the chart Fig. 11, which is just above the solid B. P. line of the chart. It will be understood however that the B. P. values will vary somewhat under different operating conditions and that the dotted B. P. line Fig. 11 represents an average value which may be reasonably closely approached under all operating conditions by the means here disclosed. The variation in back pressure as indicated by the dotted B. P. line, Fig. 11, is, of course, accompanied by a corresponding change in forward pressures, not indicated on the chart.

In a transmission which is subjected to rapid fluctuations or reversal of operating pressures, or where there may be fluctuations or chatter set up by the periodic response of structure or transmission to shock or vibration, it is desirable that means be provided to damp out such periodic response substantially as soon as it is started, or to initially prevent it. In any pressure control device such as 90 and similar devices such means is particularly desirable because pressure control devices normally have a tendency to momentarily over-correct the pressure. Thus, for instance, when the plunger 92 moves in either direction it tends to continue past the point at which it ought finally to come to rest, and unless prevented might vibrate or oscillate back and forth during its correction movements and itself be a source of vibration or chatter throughout the entire transmission and machine. Such vibration if once set up might increase in amplitude.

To prevent such an effect damping means are provided in the pressure control device 90, as follows:

A piston disc 103 is slidably mounted on plunger 92, being relatively movable axially between limits fixed by collars 104, 105. In the movement of plunger 92 in the one direction the disc 103 is shifted away from collar 104, and fluid may freely pass the disc through holes such as 106 which are then exposed. The arrangement is such that the disc and plunger may move rapidly in the direction just mentioned. In the other direction of movement of plunger 92 the disc 103 moves against the collar 104 and the holes 106 are covered. In such case the movement of the disc 103 and plunger 92 is checked, and can proceed only so fast as fluid may leak past the disc, the disc being made slightly smaller than the bore of chamber 96 to permit a predetermined rate of leakage and therefore a predetermined rate of movement.

The effect of this arrangement is to permit the plunger 92 to move very rapidly in the direction to increase the back pressure acting on table motor 72, whereby any sudden tendency to overrun is checked immediately, but preventing the plunger from vibrating, since the damping effect in the other direction of plunger movement prevents periodic vibration from starting. Substantially the same effect may be produced by an alternative arrangement such as a spring pressed check valve 107, used in combination with a disc similar to disc 103 but fixed solidly on plunger 92. In either case the disc may be loosely fitted in the bore to provide the leakage path which damps the movement in the one direction, or other suitable controlled leak means may be used.

In either form of damping device it is of advantage to provide fluid under continuous initial pressure on both sides of the piston disc 103. It is the building up of the pressure of the fluid which slows up the movement of plunger 92, and if there is an initial pressure the time required for building up the pressure to a point where it delays movement is correspondingly reduced. Without initial pressure there might still be possible a limited degree of vibratory movement in plunger 92, even though the damping means checked larger vibrations. In the present device the initial pressure utilized is that of the motor supply channel 67, which is here the most convenient pressure source, but other suitable sources might equally well be used. Such initial pressure, being balanced on both sides of piston disc 103, does not affect the operation of plunger 92 in the performance of its various other functions.

When the hand lever 61 is shifted to quick traverse position the back pressure device 90 is bypassed, the fluid then returning to reservoir 39, exclusive of the back pressure device, through a valve 108, Fig. 5. Valve 108 includes a body portion 109 positioned during feed movements to close a channel 110 which communicates with the motor outlet channel 80, Fig. 4, through a channel not shown. But when the lever 61 is shifted to quick traverse position the valve 108 is turned to such position that a valve passage 111 provides free outlet for fluid through a channel 112, the valve being connected for movement from lever 61 by the shaft 62, pinion 63, plunger 64, pinion 65 and shaft 66, previously described, and by a segment 113, Figs. 12, 13 engaging with a segment 114 fixed on the valve stem.

Overload pressure release devices are provided, both for the feed pump 24 and for the quick traverse pump 29, which may be of any suitable form pressure to balance the total positive pressure. The rate of fluid delivered from the pumps to channel 67 would then not control the rate of movement of the table 1 as intended, and instead of a pressure in the channel 67 there would be a vacuum, because the normal delivery of fluid from the pumps would not be sufficient to keep the channel 67 filled at the rate of table and piston travel resulting under such conditions. If such a condition of overrun were permitted, even for an instant, it would probably damage the machine, the work, or the cutters.

Such over-run might be avoided by the use of a back pressure device which furnished continuous high back pressure, sufficient to balance any positive cutting pressure ever used in the machine, but if this were done, the table transmission would normally have to overcome a high constant back pressure, and the normal power waste would be correspondingly large. In addition, such a device would restrict the normal maximum cutting capacity of the machine. Such type of back pressure device is practicable, therefore, only in transmissions where the maximum positive load pressure is relatively small, or where the operation of the machine is such that the load pressure is always negative.

To avoid the difficulties occasioned by the tendency of piston 74 to over-run its transmission when the cutting pressures are positive, the outlet channel 80, Fig. 4, normally communicates, through piping 89, with a pressure control device generally denoted by the numeral 90, Figs. 4, 9, from which fluid flows through an outlet 91 to the reservoir 39.

The back pressure device 90 is constructed as follows: A throttle plunger member 92, Fig. 9, is continuously urged by a spring 93 in a direction to shut off throttle openings such as 94, 95, through which fluid passing from motor 72 through piping channel 89 must pass before the fluid reaches the outlet 91. The spring end of the plunger 92 is materially larger in diameter than the other or throttle end, and at an intermediate point there is provided a chamber 96, which is continuously in communication through a channel 97 and a pipe 98, Figs. 9, 7, with the pressure fluid carried by the pump outlet channel 67, Figs. 3, 7. Thus whatever pressure exists in the channel 67 is continuously opposing the spring 93, Fig. 9, over an effective area equal to the difference in area of the two ends of plunger 92.

The effect of the opposed forces acting on plunger 92 is to cause movement of the plunger in a direction to close the throttle openings 94, 95 whenever the pressure in channel 67 drops, and vice-versa, the respective movements increasing or decreasing the back pressure acting on the table motor 72. Upon consideration it will be obvious that the device will never permit the pressure to drop to zero in channel 67, because the spring 93 would then have no opposition and the throttle openings would close completely thereby raising the back pressure toward infinite value, which in turn would obviously raise the forward pressure toward infinite value.

For the reason just stated the device will not permit the table to over-run its transmission. An over-running condition, as previously explained, would cause a zero or sub-zero pressure in the channel 67, and this is impossible by reason of the action of the device 90.

Figure 10:
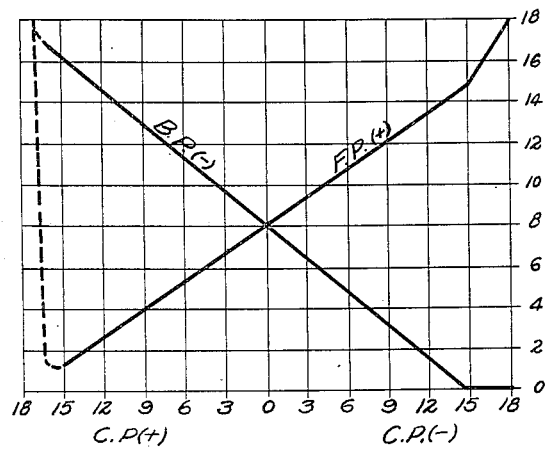
Figs. 10, 11 are charts illustrating certain operating characteristics of the back pressure device shown in Fig. 9.

This much being understood, the characteristic action of the device 90 may be readily understood by reference to the chart, Fig. 10, which is based upon the proposition, previously stated, that the combined values of pressures acting on table 1 or piston 74 must always be equal to zero, when added algebraically with proper positive and negative designation, the forward pressure (F. P.) being assumed to be positive, in which case the back pressure (B. P.) would be negative. As previously pointed out the table load or cutting pressure (C. P.) may sometimes be positive and sometimes negative. The simultaneous values of F. P. and B. P. as read against the vertical scale, will be found to satisfy these requirements when taken at the points where their lines intersect any vertical line corresponding to a given value of C. P., either positive (+) or negative (−).

The dotted lines at the left of the chart, Fig. 10, illustrate what would occur, as previously pointed out, before the value of F. P. in channel 67 drops to zero. As previously explained, at some point prior to zero value of F. P. the throttle openings 94, 95, would be completely closed by plunger 92 and both the B. P. and F. P. would then increase rapidly toward infinite value, and then, of course, the piston would stop moving. During such operation the equation for balance of pressures on the table piston would no longer be applicable.

The chart, Fig. 10, is drawn upon the supposition that when the C. P. is negative, that is to say opposing the F. P., and of high value, no B. P. is required, and that at the negative value of 15 units of C. P. the throttle openings 94, 95 will be fully opened by the movement of plunger 92, brought about by the F. P. in channel 67, whereby no B. P. exists so far as concerns the plunger 92. By thus designing the device 90 the use of the device does not reduce the maximum capacity of the table transmission.

The chart, Fig. 10, also assumes such values or design characteristics for the effective pressure area of plunger 92, and for the operating characteristics of spring 93, and for the effective form or shape of the end of plunger 92 which cooperates with the throttle openings 94, 95, as would produce straight line values of B. P., and therefore also of F. P. Such a condition could be readily arrived at by choosing suitable values of one or more of the items mentioned, but in practice such straight line characteristics are not desirable, partly for the reason that it would bring the B. P. and therefore the F. P. to high value at times when a high value is not required, as for instance when there is no table load, thereby wasting the power required to set up the F. P. required to overcome the unnecessary B. P.

For that reason the device 90 is preferably given such form, by suitably proportioning the various elements mentioned, as to produce a curved B. P. line, approximately as indicated by the full B. P. line in Fig. 11. For purposes of illustration the plunger form is here shown as including three differently tapered conical end portions 99, 100, 101, Fig 9, but it will be understood that various other forms might be used.

The charts, Figs. 10, 11 and the operating characteristics of device 90 have thus far been considered as though the friction of table movement and of the passage of fluid through the outlet channels was of no effect. As a matter of practice friction must be considered, and particularly where the transmission is used for purposes which require a large variation between the minimum and maximum motor rates. Such rate and capacity but in this instance comprise spring pressed balls such as 115, 116, Fig. 7.

From the foregoing it will be understood that the table motor 72 will operate in either direction or be locked in stop position according to the position of hand lever 83, and that it will operate at feed or quick traverse according to the position of hand lever 61, the feed rate being determined by the adjustment of lever 50 and throttle 45. When the quick traverse rate is engaged, the throttle 46 is completely opened but the position of throttle 45 is not disturbed and the fluid then pumped by the quick traverse pump 29 is added to that of the feed pump 24.

The movements effected by the hand levers 61, 83 are also intended to be automatically effected by means such, for instance, as table dogs such as 117, 118, 119, 120, Fig. 3, operating on plungers 121, 122, 123, 124 which are suitably connected to the parts to be operated, but since such dog operated controls are well known in a variety of forms they need not be described in detail.

What is claimed is:

1. In a machine tool, the combination of a base, a tool support and a work support each supported from said base and one of which is bodily movable, a transmission connected for movement of said movable support and including rate change means, means restraining said movable support in opposition to said transmission, means including a pressure-responsive back pressure valve decreasing the restraining effect of said restraining means as transmission pressure delivered to said support is increased and vice versa, and other means including a frictional resistance element restraining said support and operative to increase the restraint as the rate of said support is increased and vice versa.

2. In a machine tool, the combination of a base, a tool support and a work support each supported from said base and one of which is bodily movable, a transmission connected for movement of said movable support and including rate change means, oppositely movable means restraining said movable support in opposition to said transmission, means including a pressure-responsive back pressure valve decreasing the restraining effect of said restraining means as transmission pressure delivered to said support is increased and vice versa, other means including a frictional resistance element restraining said movable support and operative to increase the restraint as the rate of said support is increased and vice versa, and means for damping the movement of the first mentioned restraining means.

3. In a machine tool, the combination of a base, a tool support and a work support each supported from said base and one of which is bodily movable, a transmission connected for movement of said movable support and including rate change means, a first restraining means opposing movement of said support from said transmission, pressure responsive means decreasing the effect of said restraining means in accordance with an increase in the pressure delivered from said transmission and vice versa, said first restraining means being also operative to decrease the restraint as the rate of said support is increased and vice versa, and a second restraining means including a restricted flow opening operative to increase the restraint as the rate of said support is increased and vice versa.

4. In a machine tool, the combination of a base, a tool support and a work support each supported from said base and one of which is bodily movable, a transmission connected for movement of said movable support including a reverser device and a rate changer, means restraining said movable support and opposing said transmission, pressure responsive control means operative in either direction effect of said reverser for altering the restraining effect of said restraining means in accordance with the pressure delivered from said transmission, and liquid flow restricting means for variably restraining said movable support in opposition to said transmission in accordance with the rate of support movement.

5. In a pressure control device for a hydraulic system, the combination of a body of fluid under pressure, control valve means movable to control said pressure, means for damping the movement of said control valve including piston and liquid filled cylinder means co-operative therewith, and means maintaining the liquid within said cylinder at substantial pressure.

6. In a pressure control device for a hydraulic system, the combination of a body of fluid under pressure, control valve means movable to control said pressure, and means for damping the movement of said control valve including piston and liquid filled cylinder means, said cylinder being in communication with said body of pressure fluid whereby to maintain the liquid on both sides of said piston at substantially the pressure of said pressure fluid.

7. In a pressure control device for a hydraulic system, the combination of a body of fluid under pressure, control valve means movable to control said pressure, and means for damping the movement of said control valve including cylinder and piston means connected therewith, a channel for the supply of liquid to one end of said cylinder including a check valve opening toward said piston and means controlling egress of liquid from said end of the cylinder, including a restricted leakage channel.

8. In a pressure control device for a hydraulic system, the combination of a body of fluid under pressure, control valve means movable to control said pressure, and means for damping the movement of said control valve including cylinder and piston means connected therewith, channels for the supply of liquid to both ends of said cylinder, means maintaining said supply of liquid at substantial pressure, and means for restricting egress of fluid from one end of said cylinder.

9. In a milling machine, the combination of reciprocable work table, a tool spindle adjacent thereto and rotatable on an axis transverse to the path of movement of said table, a spindle transmission, a transmission for reciprocation of said table including in the order recited a variable delivery fluid source, a fluid operable motor and movable back pressure valve means restraining said motor and opposing said source, pressure responsive means decreasing the restraining effect of said valve means in accordance with increase in the pressure of fluid delivered to said motor from said source and vice versa, and means for damping the movement of said valve means.

10. In a milling machine, the combination of reciprocable work table, a tool spindle adjacent thereto and rotatable on an axis transverse to the path of table movement, a transmission for rotation of said spindle, a transmission for reciprocation of said table including in the order recited a variable pressure source, a motor and back pressure means restraining said motor and opposing said source, pressure responsive means decreasing the restraining effect of said restraining means in accordance with increase in the pressure delivered to said motor from said source and vice versa, and other restraining flow restricting means including means increasingly restraining said motor as the motor rate increases and vice versa.

11. In a milling machine, the combination of reciprocable work table, a tool spindle adjacent thereto and rotatable on an axis transverse to the path of movement of said table, a spindle transmission, a transmission for reciprocation of said table including in the order recited a variable delivery fluid source, a fluid operable motor and movable back pressure valve means restraining said motor and opposing said source, pressure responsive means decreasing the restraining effect of said valve means in accordance with increase in the pressure of fluid delivered to said motor from said source and vice versa, said restraining means being decreasingly effective as the motor rate increases, and other motor restraining means including flow restricting means increasingly effective as the motor rate increases and vice versa.

12. In a milling machine, the combination of reciprocable work table, a tool spindle adjacent thereto and rotatable on an axis transverse to the path of movement of said table, a spindle transmission, a transmission for reciprocation of said table including a variable pressure source, a motor and movable back pressure means restraining said motor and opposing said source, pressure responsive valve means decreasing the restraining effect of said restraining means in accordance with increase in the pressure delivered to said motor from said source and vice versa, and means for damping the movement of said restraining valve means.

13. In a milling machine, the combination of reciprocable work table, a tool spindle adjacent thereto and rotatable on an axis transverse to the path of movement of said table, a transmission for reciprocation of said table including in the order recited a variable delivery fluid source, a fluid operable motor and movable back pressure valve means restraining said motor and opposing said source, means including a pressure responsive element operative to decrease the restraining effect of said valve means in accordance with increase in the pressure of fluid delivered to said motor from said source and vice versa, said restraining means being decreasingly effective as the motor rate increases, other motor restraining means including a restricted passageway providing restraining action increasingly effective as the motor rate increases and vice versa, and damping means for said valve means including piston and cylinder means, means for supply of liquid at substantial pressure to said cylinder on both sides of said piston, and means limiting the egress of fluid from one end of said cylinder including a restricted leakage path.

14. In a machine tool having relatively movable cutter supporting and work supporting elements, the combination with a hydraulic power transmission system disposed to exert actuating pressure for effecting relative movement of said elements, of means for preventing over-running of said relatively movable elements under the influence of cutting forces, including a valve disposed to exert back pressure for opposing cutting forces exerted in the same direction as the force exerted by the transmission system actuating pressure, said back pressure valve comprising a piston valve responsive to changes in the actuating pressure and operative thereby in manner to regulate the back pressure in inverse proportion to the actuating pressure, and a one way damping device associated with said piston valve and cooperating therewith in manner to resist movement of said valve in one direction to prevent vibration thereof but permitting rapid movement thereof in the direction effective to increase the back pressure in preventing over-running of said movable elements.

15. In a machine tool having relatively movable work supporting and cutter supporting elements, a hydraulic power transmission system disposed to effect relative movement of said elements in cutting operations, control means operative to regulate the rate of relative movement of said supporting elements by said hydraulic system, a back pressure valve operatively connected to impose back pressure upon said hydraulic system to prevent over-running of said relatively movable elements, said back pressure valve including a valve plunger operative in response to variations in the actuating pressure of said hydraulic system to increase the back pressure upon decrease in the feeding pressure, and including a restricted escape orifice operative to increase the back pressure upon increase in the speed of said relative movement.

16. In a machine tool, relatively movable tool supporting and cutter supporting elements, a double acting cylinder and piston mechanism disposed to effect relative movement of said elements, a hydraulic power transmission system operatively connected to said cylinder and piston mechanism to actuate it, control mechanism associated with said hydraulic system and effective to regulate the speed of operation of said cylinder and piston mechanism and the direction of relative movement effected thereby, and a back pressure valve operatively connected with said cylinder and piston mechanism to prevent over-running of said mechanism in either direction under the influence of external forces, said back pressure valve comprising a piston valve operatively connected to regulate the back pressure in inverse relation to the pressure being exerted to cause said relative movement, and a fixed damping orifice constituting a restricted passageway operative to regulate the back pressure in direct relation to the speed of said relative movement, whereby adequate back pressure is established to prevent over-running of said relatively movable supports whenever a reduction in actuating pressure occurs and in proportion to the speed of operation of the machine.

17. In a machine tool having relatively movable cutter supporting and work supporting elements, the combination with a hydraulic power transmission system disposed to exert actuating pressure for effecting relative movement of said elements, of means for preventing over-running of said relatively movable elements under the influence of cutting forces, including a valve disposed to exert back pressure for opposing cutting forces exerted in the same direction as the force exerted by the transmission system actuating pressure, said back pressure valve comprising a piston valve responsive to changes in the actuating pressure and operative thereby in manner to regulate the back pressure in inverse proportion to the actuating pressure, a damping disc carried by said piston valve and operative within fluid under said actuating pressure, and means disposed to permit fluid to pass said disc readily in one direction to allow rapid closing of said valve and disposed to resist fluid flow past said disc in the other direction to prevent vibration of said valve, whereby back pressure may be established quickly and smoothly upon occurrence of a tendency of said relatively movable elements to overrun.

18. In a milling machine having a frame, a toothed cutter rotatably carried by said frame, and a reciprocatory work supporting table slidably carried by said frame in position to execute work feeding movements in cooperating relation with said cutter; the combination with means arranged to rotate said cutter in engagement with a workpiece fixed on said table in manner to exert on said work piece pulsating forces acting in direction to urge said table in the direction of its feeding movement; of a hydraulic actuating system for said work table comprising a hydraulic motor disposed to advance said table in feeding direction, regulatable means connected to supply pressure liquid to said motor at selected predetermined rate to control the rate of feeding movement of said table, a back pressure valve apparatus connected to receive exhaust liquid from said motor and operating in accordance with the pressure of the liquid being supplied to said motor to maintain back pressure on said motor in inverse relation to the pressure of the supplied liquid to thereby prevent overrunning of said table under the influence of the forces exerted thereon by said cutter, and a damping device associated with said back pressure valve and operative to damp vibrations thereof resulting from the force pulsations exerted by said cutter to thereby prevent vibration of said table and obviate chattering of said cutter in operating upon the workpiece.

WALTER POHL.